UNITED STATES PATENT OFFICE.

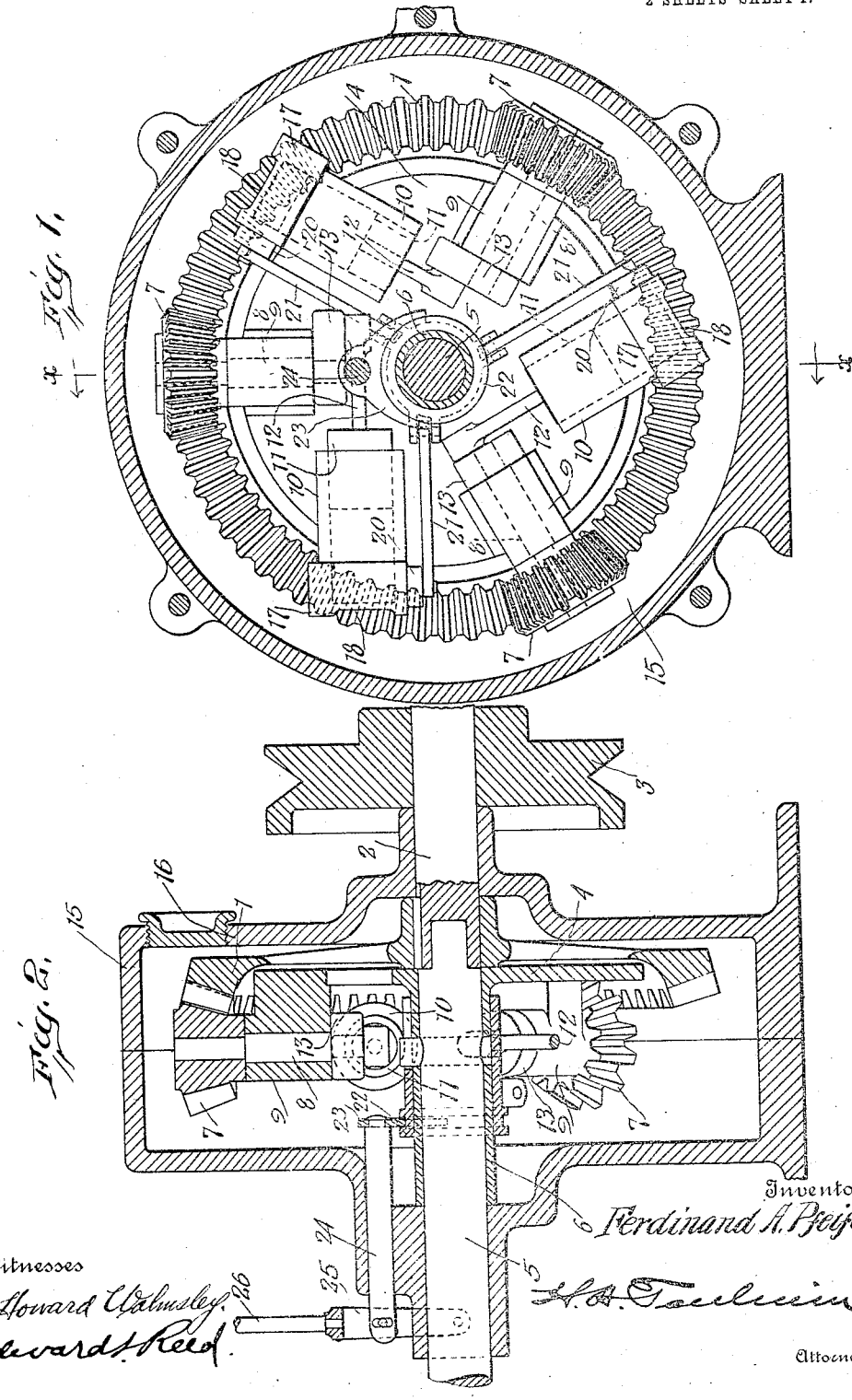

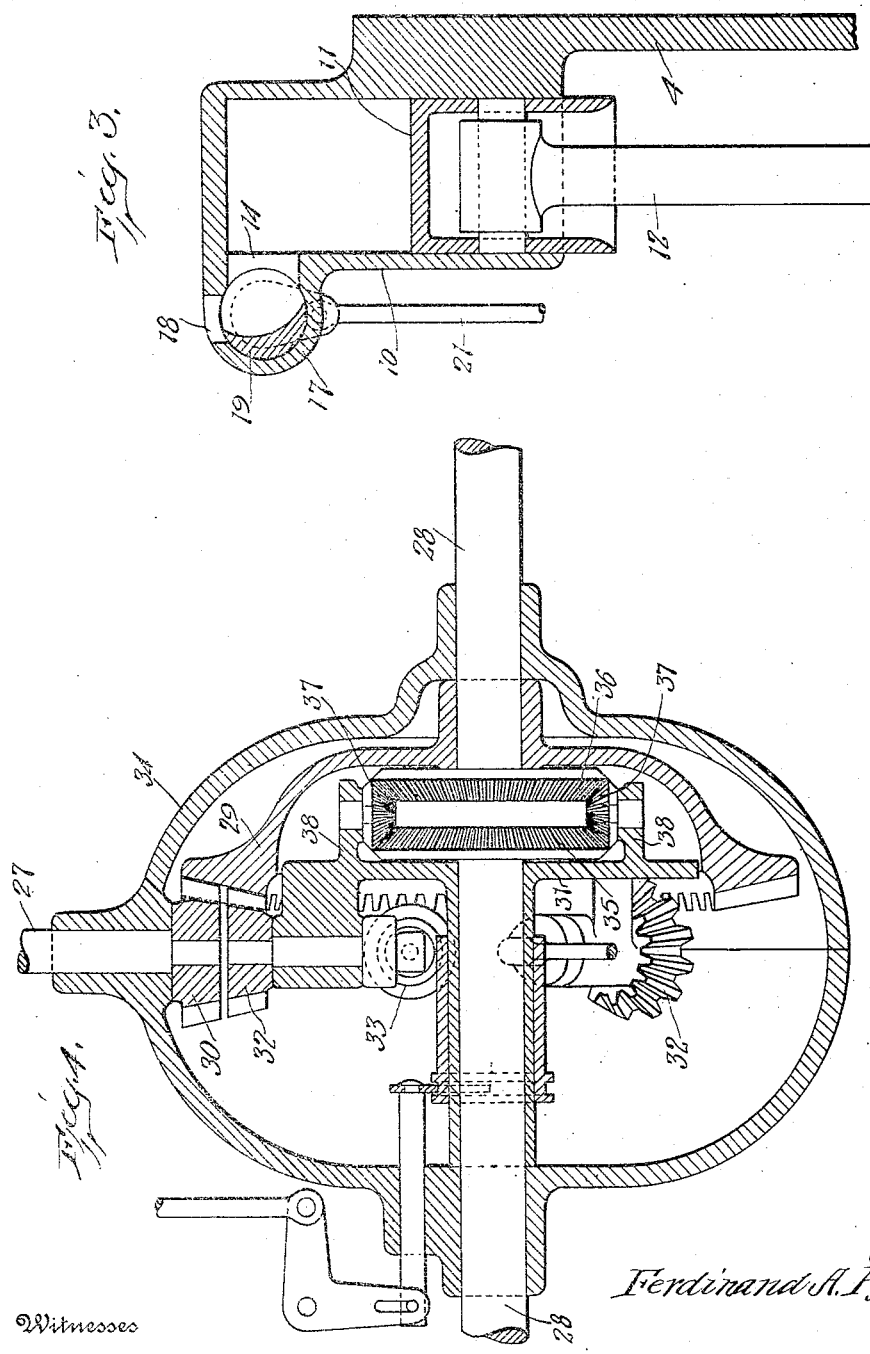

FERDINAND A. PFEIFER, OF SPRINGFIELD, OHIO.

VARIABLE-SPEED POWER-TRANSMISSION DEVICE.

1,067,487.   Specification of Letters Patent.   Patented July 15, 1913.

Application filed December 19, 1910. Serial No. 598,166.

*To all whom it may concern:*

Be it known that I, FERDINAND A. PFEIFER, a citizen of the United States, residing at Springfield, in the county of Clark and State of Ohio, have invented certain new and useful Improvements in Variable-Speed Power-Transmission Devices, of which the following is a specification, reference being had therein to the accompanying drawings.

This invention relates to variable speed power-transmission devices, and the object of the invention is to provide such a device in which the power will be positively transmitted from the driving member to the driven member and in which the variations of speed may be accomplished gradually, as distinguished from the step by step method now customary with positive transmission devices.

To this end it is also an object of the invention to accomplish the variations of speed by the use of fluid controlled mechanism.

A further object of the invention is to combine such variable speed power transmission device with a compensating gearing.

In the accompanying drawings, Figure 1 is a vertical, sectional view of a power transmission device embodying my invention; showing the active parts thereof in elevation; Fig. 2 is a vertical, sectional view, taken on the line x x of Fig. 1 and looking in the direction of the arrows; Fig. 3 is a sectional view taken longitudinally through one of the fluid-controlled devices; and Fig. 4 is a vertical, sectional view taken centrally through a modified form of the invention.

In these drawings I have illustrated two forms of my invention. In Figs. 1 and 2 I have shown the invention embodied in a form capable of general application, while in Fig. 4 I have shown the invention embodied in a form designed particularly for use with automobiles, and, to this end, I have combined therewith compensating gearing. In both forms of the device the main features of the invention are identical and the modifications consist principally in changes in the manner of connecting the parts of the device with the driving member and the driven member, respectively. In both forms of the invention here illustrated I have shown the device as comprising an annular toothed member, such as a gear, rotatably mounted and have arranged adjacent to the toothed member or gear a support which is rotatable about an axis coincident with the axis of the gear and has rotatably mounted thereon a series of pinions which mesh with the gear. One of these members is connected with the driving member of a machine and the other with the member to be driven. Suitable means are provided for controlling the speed at which the pinions rotate upon the support, thereby enabling the speed at which the power is transmitted from the driving member to the driven member to be controlled, as hereinafter described.

In that form of the invention illustrated in Figs. 1 and 2 I have shown the same as comprising an annular gear 1 connected with the driving member, preferably by rigidly mounting the same upon the shaft 2 which constitutes that member and which is provided with a driving pulley 3. Mounted adjacent to the gear 1 and rotatable about an axis coincident with the axis thereof is a support 4 which is connected with the driven member, preferably by mounting the same on a shaft 5 which constitutes said driven member. This shaft is arranged in alinement with the shaft 2 and the support 4 is provided with a sleeve 6 which telescopes the shaft 5 and is pinned thereto. A series of pinions 7 are mounted on the support 4 and mesh with the gear 1. Preferably each pinion is rigidly secured to the outer end of a short shaft 8 arranged substantially radially on the support and journaled in a bearing 9 carried thereby. The speed at which the pinions rotate may be controlled, and, by reducing the speed of rotation of the pinions the gear and the support will be interconnected and the latter driven from the former, thereby transmitting motion from the driving member to the driven member. The speed at which this motion is transmitted depends upon the speed at which the pinions rotate. If these pinions are locked against rotation the driving member and the driven member will be directly connected and will rotate in unison. If the pinions are allowed to rotate freely no motion will be transmitted from one member to the other.

By regulating the speed at which the pinions rotate motion can be transmitted at any desired speed between the two extremes mentioned. The control of the pinions may be secured in various ways, but I prefer to employ fluid-controlled devices. To this end I have mounted on the support 4 a series of fluid cylinders 10, there being one cylinder for each pinion and each cylinder being located at substantially right angles to the axis of rotation of its pinion. Mounted within each cylinder is a piston 11 connected by a piston rod 12 with a crank arm 13 rigidly secured to the inner end of the shaft on which the respective pinion is mounted, thus causing the pinion and the piston to move in unison. Each cylinder is connected with a source of fluid supply and the reciprocation of the piston within the cylinder will cause the fluid to be drawn into and discharged from said cylinder. The piston can reciprocate no faster than the fluid can enter and escape from the cylinder. Consequently, by controlling the flow of fluid to and from the cylinder the speed at which the piston and the pinion move can be controlled. This can be accomplished in numerous ways, but I have here shown the entire mechanism as mounted in a fluid-tight casing 15 and have formed in the cylinders near their ends ports 14 which connect the cylinders with the interior of the fluid-tight casing. Any suitable fluid may be employed, but with the form of device here shown I prefer to use oil which can be injected into the casing through an opening 16 therein. Any suitable means may be employed for so regulating the flow of fluid to and from the cylinders. In the present instance I accomplish this by means of turn plug valves comprising small valve casings 17 preferably formed integral with the cylinders 10, communicating with the ports 14 and also communicating with the interior of the main casing 15 by ports 18. The ports 18 are controlled by rotary valve members 19, one end of each of which projects beyond the end of its valve casing and is provided with a short crank arm 20, which, in turn, is connected by a pitman 21 with a grooved collar 22 slidably mounted on the sleeve 6. A yoke 23 engages the grooved collar 22 and has connected thereto a rod 24 extending through an opening in the casing 15 and having its outer end connected with suitable operating mechanism, which, in the present instance, comprises a lever 25 and an actuating member 26. The arrangement of the valve members 19 and their connections with the operating device being uniform the flow of fluid to and from the several cylinders will also be uniform and the same amount of resistance will be offered to the rotation of the several pinions. It will be obvious that the amount of fluid which is permitted to pass through the ports 18 in the valve casings may be regulated to a very fine degree and that the variations of the movements of the several pinions relatively to the gear will be gradual and that any desired degree of speed between the maximum and minimum limits may be secured.

In Fig. 4 I have illustrated a form of the device which is particularly adapted for use in connection with automobiles and which has combined therewith a compensating gearing. As above stated, the main features of construction of this form of the device are similar to the corresponding features of the device just described, but their arrangement has been somewhat altered. The driving member comprises a driving shaft of an automobile, as indicated at 27, and the driven member comprises the axle of the automobile which is indicated at 28 and is arranged at right angles to the driving shaft 27. An annular gear 29, corresponding to the gear 1, is rotatably mounted on the axle or driven member 28 and is connected with the driving member 27 by means of a pinion 30 rigidly secured to said driving member and meshing with said gear. A support 31 is carried by the driven member 28 and has mounted thereon pinions 32 and fluid-controlled cylinders 33 having their pistons connected with the pinions in the same manner as that above described. The pinions 32 mesh with the inner portion of the annular gear 29, the toothed face of this gear being of sufficient width to simultaneously mesh with both the pinions 30 and 32. The active parts of the device being inclosed in a casing 34 forming a fluid receptacle and the amount of rotation permitted to the pinion 32 being controlled in the same manner as that above described, it will be obvious that the speed at which power is transmitted from the shaft 27 to the axle 28 is positively controlled and that the variations thereof may be accomplished gradually.

The driven member or axle 28 is formed in two parts terminating within the casing 34 which incloses the transmission device. The two portions of the axle have rigidly secured thereto bevel gears 35 and 36, which gears mesh with bevel pinions 37 carried by arms 38 rigidly secured to the support 31. Thus, it will be apparent that the power is applied from the support 31 to the axle through compensating gearing which will permit either portion of the axle to move independently of the other portion thereof.

The operation of the device will be readily understood from the foregoing description and it will be apparent that I have produced a variable speed gearing comprising toothed gears and pinions, in which the variations of speed may be accomplished gradually and have entirely eliminated the severe strains and the excessive wear on the machinery caused by the jerking and jarring action which accompanies the shifting of the ordinary toothed transmission gearing. It will further be apparent that the mechanism by which this is accomplished is of an exceedingly simple construction having no parts which will be easily broken or disarranged and having its several parts of a strong, durable character. It will also be apparent that by providing a plurality of pinions and mounting each crank arm in a different position relative to its pinion the several pistons are not caused to travel in unison but will reach the limits of their strokes successively, and, when one piston is at the end of its stroke and its crank arm has crossed its dead center position, at least one other piston will be in an intermediate position and will be acting upon the fluid. Consequently, a uniform resistance is offered to the movement of the member carrying the pinions relatively to the other member and motion is transmitted smoothly and continuously from one member to the other.

While I have illustrated one principal method of carrying out the invention and a slight modification thereof it will be apparent that the invention can be applied to transmission devices of various kinds and that the manner of applying the same can be widely varied without departing from the spirit of my invention and I, therefore, wish it to be understood that I do not desire to be limited to the details of construction, for obvious modifications will occur to a person skilled in the art.

Having thus fully described my invention, what I claim as new and desire to secure by Letters Patent, is:—

1. The combination, with a driving member, a driven member, and a fixed casing comprising a fluid receptacle, of gears mounted in said casing, connected with the respective members and permanently in mesh one with the other, and fluid-controlled means to control the rotation of one of said gears relatively to the other of said gears, said fluid-controlled means being in communication with said fluid receptacle and being independent of the member with which the first-mentioned one of said gears is connected.

2. The combination, with a driving member, a driven member, and a fixed casing comprising a fluid receptacle, of a gear mounted in said casing and connected with one of said members, a plurality of pinions mounted within said casing, connected with the other of said members and permanently in mesh with said gear, a support for said pinions, a plurality of fluid cylinders mounted on said support and communicating with said fluid receptacle, a piston mounted in each of said cylinders and connected with one of said pinions, and means to control the flow of fluid to and from said cylinders.

3. The combination, with a driving member, a driven member, and a fixed casing comprising a fluid receptacle, of a gear mounted in said casing and connected with one of said members, a plurality of pinions mounted within said casing, connected with the other of said members and permanently in mesh with said gear, a support for said pinions, a fluid cylinder mounted on said support adjacent to each of said pinions and communicating with said fluid receptacle, a piston mounted in each of said cylinders, a shaft connected with each of said pinions, a crank arm connected with each shaft, means for connecting each crank arm with the respective piston, said crank arms being arranged in different positions relatively to the respective pinions, and means to control the flow of fluid to and from said cylinders.

4. The combination, with a driving member, a driven member, and a casing forming a fluid receptacle, of a gear mounted within said casing and connected with one of said members, a support mounted within said casing, connected with the other of said members and rotatable about an axis coincident with the center of said gear, a pinion rotatably mounted on said support, a cylinder having an opening communicating with the interior of said casing, a piston mounted in said cylinder and operatively connected with said pinion, and means to control the flow of fluid through the opening in said cylinder.

5. The combination, with a driving member, a driven member, and a casing comprising a fluid receptacle, of a gear mounted within said casing and connected with one of said members, a support mounted within said casing, rotatable about an axle coincident with the center of said gear and connected with the other of said members, a series of shafts rotatably mounted on said support, a pinion mounted on each of said shafts and meshing with said gear, a crank arm secured to each of said shafts, a corresponding series of cylinders mounted on said support, a piston mounted in each of said cylinders, a piston rod connecting each of said pistons with the crank arm of the corresponding shaft, each cylinder having a port communicating with the interior of said casing, and a valve to control the flow of fluid through said port.

In testimony whereof, I affix my signature in presence of two witnesses.

FERDINAND A. PFEIFER.

Witnesses:
E. F. McKEE,
EDWARD L. REED.

Copies of this patent may be obtained for five cents each, by addressing the "Commissioner of Patents, Washington, D. C."